United States Patent

[11] 3,581,122

[72] Inventor Wilmer B. Gaunt, Jr.
Boxford, Mass.
[21] Appl. No. 678,417
[22] Filed Oct. 26, 1967
[45] Patented May 25, 1971
[73] Assignee Bell Telephone Laboratories, Incorporated
Murray Hill, Berkeley Heights, N.J.

[54] ALL-PASS FILTER CIRCUIT HAVING NEGATIVE RESISTANCE SHUNTING RESONANT CIRCUIT
7 Claims, 4 Drawing Figs.

[52] U.S. Cl. 307/295, 307/264, 307/322, 307/324, 330/28, 330/31, 330/94, 330/95, 333/6, 333/28, 333/80
[51] Int. Cl. H04b 3/14
[50] Field of Search 330/61 (A), 31, 21, 61, 94, 95, 28; 307/286, 264, 295; 333/80, 80 (T), 28, 70 (A,R), 6; 328/162, 173

[56] References Cited

UNITED STATES PATENTS

| | | | |
|---|---|---|---|
| 3,178,650 | 4/1965 | Hamasaki | 330/61 |
| 3,202,925 | 8/1965 | Watanabe | 330/31 |
| 2,852,751 | 9/1958 | Lundry | 333/28 |
| 2,679,633 | 5/1954 | Bangert | 333/80T |
| 2,745,068 | 5/1956 | Gannett | 333/80T |
| 2,792,553 | 5/1957 | Moulon | 333/80 |
| 2,585,078 | 2/1952 | Barney | 333/80 |
| 2,750,452 | 6/1956 | Goodrich | 333/80(T)X |

*Primary Examiner*—Herman Karl Saalbach
*Assistant Examiner*—Paul L. Gensler
*Attorneys*—R. J. Guenther and James Warren Falk

ABSTRACT: A transistor circuit having a constant amplitude vs frequency response is described. The required transfer function is obtained by connecting a negative resistance across a resonant network in the transistor circuit. This arrangement provides a pole-zero pattern in the complex plane representation which is symmetrical with respect to the imaginary axis whereby the absolute magnitude of the ratio of output signal to input signal is constant for all frequencies.

INVENTOR
W. B. GAUNT, JR.
BY J. S. Cubert
ATTORNEY

ALL-PASS FILTER CIRCUIT HAVING NEGATIVE RESISTANCE SHUNTING RESONANT CIRCUIT

BACKGROUND OF THE INVENTION

This invention relates to electrical networks and, more particularly, to signal transmission networks utilizing active devices and negative resistance elements.

In communication and related systems, networks are often employed to modify the characteristics of signals transmitted therethrough. Such networks may be used to alter the amplitude or the phase characteristics of signals, or both, as a function of frequency. One transmission network known as an all-pass filter is particularly useful where it is desired to modify only the phase properties of a signal. The transfer function relating the output signal to the input signal of this type of filter has the same magnitude at all frequencies within the frequency band of interest. Phase equalizers inserted in transmission systems to correct distortion due to transmission line properties may comprise a cascaded series of such all-pass filters.

All-pass filters may also form part of a modulation scheme such as single sideband modulation wherein a quadrature relationship between signals is needed. In such schemes, it is necessary to produce two versions of a single input signal which have identical amplitude characteristics and phase characteristics that differ by 90° over the required band of frequencies. By passing the input signal through two parallel all-pass filters having a 90° difference in phase response, the desired result may be accomplished without producing an amplitude difference between the out-of-phase output signals. This circuit function is a necessary part of both quadrature modulators and their corresponding quadrature demodulators.

One type of all-pass filter network in common use comprises a lattice network using either RC or LC elements. The design of such networks is complex and expensive and the desired circuit response may be physically realized only under special conditions. Additionally, the lattice network generally requires a balanced input, i.e. a signal consisting of two equal but oppositely phased components each applied to a separate lead. A transformer may be used to produce a balanced signal. The transformer, however, complicates the filter design and is practical only within a limited frequency range.

Circuits employing active devices have been devised to provide improved all-pass filters. But such active circuits have often included a plurality of active devices and arrangements which make adjustment of the all-pass filter characteristics difficult. These circuits have also been restricted, in general, to first order all-pass transfer functions. In order to provide higher order transfer characteristics, it has been necessary to make a complex cascaded array of first order circuits.

BRIEF SUMMARY OF THE INVENTION

This invention is a single transistor circuit having a second order constant amplitude transfer characteristic as a function of frequency. An input signal is applied to the base of the transistor and coupled therefrom to the emitter. The emitter is connected to a network comprising a series resonant circuit across which a negative resistance element is placed. The negative resistance is adjusted to be twice the resistance of the resonant circuit. The amplitude of the signal at the collector of the transistor in response to the input signal is modified by the network connected to the emitter so that the magnitude of the ratio of the output signal to the input signal is constant at all input signal frequencies. This circuit arrangement has a second order pole-zero pattern in the complex plane representation which is symmetrical with respect to the imaginary axis whereby a wide range of all-pass filter characteristics may be realized.

DETAILED DESCRIPTION

Figure 1:
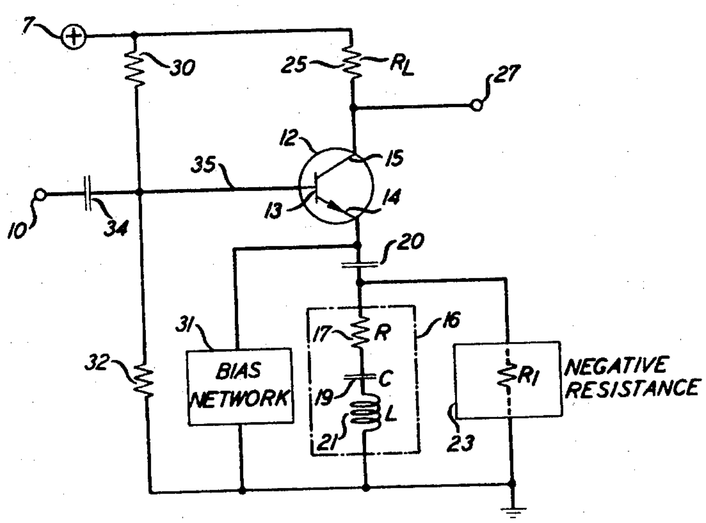
FIG. 1 depicts the preferred embodiment of this invention.

FIG. 1 shows an all-pass filter circuit in which the ratio of output signal at terminal 27 to an input signal applied to terminal 10 is a constant magnitude regardless of frequency. The input signal applied to terminal 10, which signal may comprise a plurality of frequency components, is coupled to base 13 of transistor 12 via capacitor 34 and lead 35. Capacitor 34 isolates the DC voltage at base 13 from the DC voltage which may be present at terminal 10. It is to be understood that other coupling arrangements such as a transformer or a direct connection may be used in place of capacitor 34. Positive voltage source 7 provides a DC voltage to appropriately bias collector 15 and base 13. Resistors 30 and 32 apply an appropriate bias current to base 13. Bias network 31, connected to emitter 14, permits transistor 12 to operate within its linear range. This bias network is shown by way of example only, and the bias network may comprise active networks or other arrangements well known in the art. The impedance of the bias arrangement advantageously may be sufficiently high that its effect on the subsequently described circuit operation is negligible; alternately the shunting effect across the negative resistance 23 may be calculated. Of course, the negative resistance 23 may also provide the emitter bias current so that transistor 12 operates within its linear range without a shunting bias impedance.

The input signal at base 13 is coupled via the base-emitter path of transistor 12 to emitter 14 and applied therefrom to network 16 across which negative resistance 23 is placed. Network 16 comprises a series resonant circuit having a resistance 17, an inductance 21, and a capacitance 19. Capacitor 20 connected between emitter 14 and network 16, or one of many alternative arrangements well known in the art, may serve to isolate the emitter bias current from network 16 and negative resistance 23. Network 16 and negative resistance 23 receive only the emitter current signals responsive to the input signal. Negative resistance 23 may comprise a negative resistance amplifier in which feedback produces the desired negative impedance. The current from emitter 14 passes through the emitter-collector path of transistor 12 and resistor 25 which is connected to collector 15. In accordance with the well-known principles of transistor operation, the collector current is substantially equal to the current from emitter 14 where transistor 12 is a high gain unit. The output signal, the voltage across resistor 25 due to the signal current flowing in collector 15, appears at terminal 27.

The transfer function from terminal 10 to terminal 27 of the circuit of FIG. 1 has the properties of a signal filter which properties may be derived as follows. The signal voltage at emitter 14 responsive to the input signal voltage applied to base 13 is substantially the same as the signal voltage at base 13 so that the emitter signal current is substantially the base signal voltage, $v$, divided by the total impedance of network 16 in parallel with negative resistance 23. It is assumed that the shunting impedance of bias network 31 is negligible. The impedance of network 16, as is well known in the art, is $$Lp+\frac{1}{Cp}+R$$

where $L$ is the value of inductor 21, $C$ is the value of capacitor 19, $R$ is the value of resistor 17, and $p$ is the complex frequency variable. Resistor 17 includes the resistance of inductor 21. The impedance of negative resistance 23 is $-R_1$ which may be appropriately selected to equal $2R$ to provide all-pass filter characteristics. The total impedance, $Z_T$, at emitter 14 due to network 16 and negative resistance 23 may be expressed as the product ratio $$\frac{(p-a_1)(p-a_2)}{(p+a_1)(p+a_2)} \quad (1)$$

where $a_1$ and $a_2$ are the roots of the quadratic expressions in Eq. (1). These roots are $$a_1=-\frac{R}{2L}+\sqrt{\left(\frac{R}{2L}\right)^2-\frac{1}{LC}} \quad (2a)$$

$$a_2=-\frac{R}{2L}-\sqrt{\left(\frac{R}{2L}\right)^2-\frac{1}{LC}} \quad (2b)$$

in accordance with well-known principles of network analysis. The voltage at terminal 27 is substantially equal to $$\frac{v}{Z_T}R_c$$

$R_2$, where $R_c$ is the value of collector resistor 25 because the collector current is equal to the emitter current $V/Z_T$. Thus, the transfer function of the circuit of FIG. 1

$$T=\frac{R_c(p-a_1)(p-a_2)}{2R(p+a_1)(p+a_2)} \quad (3)$$

Figure 2:
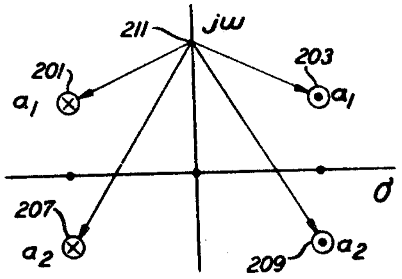
FIG. 2 shows the complex plane representation of one transfer function which may be obtained from the preferred embodiment of this invention.

This may be represented in the complex plane as shown on FIG. 2 where $a_1$ and $a_2$ are complex quantities if $$\left(\frac{R}{2L}\right)^2<\frac{1}{LC}$$

Point 203 on FIG. 2 to the right of the imaginary axis is the point at which the expression $p-a_1$ in the numerator of Eq. (3) becomes zero. Similarly, the point 209 to the right of the imaginary axis is the point at which the expression $p-a_2$ of Eq. (3) becomes zero. These points are as is well known, the zeros of Eq. (3). Points 201 and 207 to the left of the imaginary axis of FIG. 2 are the values at which the expressions $(p+a_1)$ and $(p+a)$, respectively, become zero. These points represent the poles of Eq. (3).

The transfer function $T$ may be evaluated for any value of $j\omega$ such as point 201 along the imaginary axis by extending vectors from each of the points 201, 203, 207, and 209 to point 211. The ratio of the product of the vectors from points 203 and 209 which are to the right of the imaginary axis to the product of the vectors from points 201 and 207 which are to the left of the imaginary axis is the magnitude of the transfer function at the frequency $j\omega$. These vectors are all equidistant from the origin of the complex plane at all values of $j\omega$. This is true because the magnitude of the complex expressions for $a_1$ and $a_2$ in Eq. (2) are always equal. Thus, no matter which frequency is chosen along the imaginary axis, the magnitude of the transfer function is constant and consequently the amplitude characteristics of the transfer function are invariant with frequency.

Figure 3:
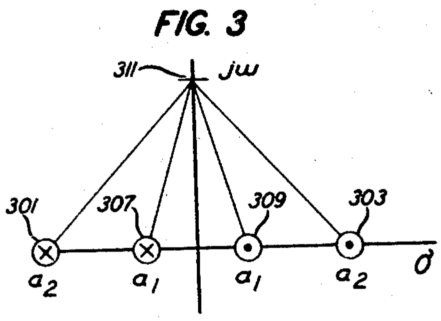
FIG. 3 shows the complex plane representation of a second transfer function which may be obtained from the preferred embodiment of this invention.

FIG. 3 shows the complex plane representation of transfer function obtained where $a_1$ and $a_2$ are real quantities, that is $(R/2L)$is greater than or equal to $1/LC$. The points 303 and 309 on FIG. 3 to the right of the imaginary axis represent the zeros of the transfer function of Eq. (3) and the points 301 and 307 to the left of the imaginary axis represent the poles of Eq. (3). Since the points on the real axis of FIG. 3 are symmetrical with respect to the imaginary axis, the value of the transfer function at any frequency $j\omega$ is the same. Thus, as in FIG. 2, the magnitude of the transfer function obtained from the circuit is invariant with frequency.

The poles and zeros of the transfer function T for either FIG. 2 or FIG. 3 may be located any place in the complex plane as long as the poles are always to the left of the imaginary axis and the zeros are always placed in a symmetrical arrangement to the right of the imaginary axis. This pole-zero configuration insures that the circuit is stable so that spontaneous oscillations do not occur.

In the complex plane representation, the phase of the transfer function $T$ can be calculated from the angles of the hereinbefore mentioned vectors with respect to the imaginary axis. Because of the large range of possible pole and zero locations, a number of phase characteristics may be devised. The phase of the transfer function is the sum of the angles of the vectors from the zeros to the selected frequency $j\omega$ and the imaginary axis less the sum of the angles of the vectors from the poles to the selected frequency $j\omega$ and the imaginary axis. Thus, by selective location of the poles and zeros, the phase response of the circuit of FIG. 1 may be varied while the amplitude response remains constant. This is true for the pole-zero configurations of both FIGS. 2 and 3. A cascaded arrangement of the circuits shown in FIG. 1 may be used to achieve higher order and more complex phase characteristics. It is noted that the input signal is connected between terminal 10 and ground. Therefore, balanced signals are not required and the transformers needed to produce the balanced signals are eliminated.

Figure 4:
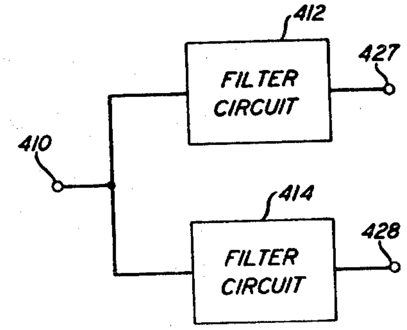
FIG. 4 illustrates the use of two circuits in accordance with the preferred embodiment of this invention to provide two output signals having quadratively related phase responses.

In single sideband modulation systems, two circuits of the type shown in FIG. 1 are used to produce identical signals that are 90° out of phase. Such an arrangement is shown in FIG. 4 where a common signal is applied to lead 410. Circuit 412 is identical to the circuit of FIG. 1 except that the resistor, capacitor, and inductor of network 16 have the values $R_2$, $C_2$ and $L_2$ respectively. Circuit 414 is also identical to the circuit of FIG. 1 except that the resistor, capacitor and inductor of network 16 have the values $R_3$, $C_3$ and $L_3$ respectively. Lead 410 is connected to terminal 10 of each of circuits 412 and 414 so that the same input signal is applied to both circuits. Since the pole-zero configuration of each circuit may be chosen independently, the circuits may be designed by appropriate selection of $R_2$, $C_2$ and $L_2$ and $R_3$, $C_3$ and $L_3$ to provide a 90° difference in phase between the two circuits. Thus, the signal output of one circuit at terminal 427 is in quadrature with the signal output from the other circuit at terminal 428. In this manner, a necessary part of a quadrature modulation circuit can be constructed. A similar arrangement of circuits of the type shown in FIG. 1 in a quadrature demodulation scheme may be devised in accordance with the preferred embodiment of this invention.

The principles of this invention have been described with reference to the foregoing preferred embodiment. Numerous other arrangements may be devised by those skilled in the art without departing from the spirit and scope of the invention.

What I claim is:

1. A transmission circuit comprising an amplifying device having first, second and third electrodes, means for applying a signal to said second electrode, and means responsive to said signal for producing an output signal at said third electrode comprising resonant network means connected to said first electrode and negative impedance means connected across said resonant network means, said resonant network comprising resistance means and said negative impedance means comprising a negative resistance having twice the value of said resistance means.

2. A transmission circuit according to claim 1 wherein said resonant network means comprises a series resonant circuit and said amplifying device comprises a transistor having emitter, base and collector electrodes corresponding to said first, second and third electrodes, respectively.

3. A transmission circuit according to claim 2 wherein said series resonant circuit comprises a capacitor and an inductor connected serially with said resistance means.

4. In an all-pass filter, in combination, an amplifying device having input, output and control electrodes, means for applying a first signal to said control electrode, and means connected to said input electrode for producing a second signal at said output electrode responsive to said first signal, the absolute magnitude of the ratio of said second signal to said first signal being invariant with frequency, said means connected to said input electrode comprising resonant network means including positive resistance means and negative resistance means connected across said resonant network means, said negative resistance means having a negative resistance value of twice the value of said positive resistance means.

5. In a signal transmission system, a plurality of transmission circuits each comprising an amplifying device having input, output and control electrodes, means for applying an input signal to said control electrode, and means responsive to said input signal for producing a signal at said output electrode comprising resonant network means including positive resistance means connected to said input electrode and a negative resistance having twice the value of said positive resistance means connected across said resonant network means, and means for applying a common signal to each of said transmission circuits, said resonant network means in each of said transmission circuits comprising means for providing a signal at the corresponding output electrode having a distinct phase response to said common signal.

6. In a signal transmission system, a plurality of transmission circuits according to claim 5 wherein said means for providing a signal at the corresponding output electrode having a distinct phase response to said common signal comprises means for providing a phase response to said common signal different from the phase response of each of the other of said plurality of transmission circuits.

7. In a signal transmission system, a plurality of transmission circuits according to claim 6 wherein said plurality of transmission circuits comprises a pair of transmission circuits, and the resonant network means of one of said pair of transmission circuits comprises mean for providing a signal at the corresponding output electrode having a phase response to said common signal in quadrature with the phase response of the other of said pair of transmission circuits.